No. 771,826. PATENTED OCT. 11, 1904.
R. LOHSE.
DEVICE FOR MEASURING THE SPEED OF FLOWING LIQUIDS.
APPLICATION FILED FEB. 27, 1904.
NO MODEL.
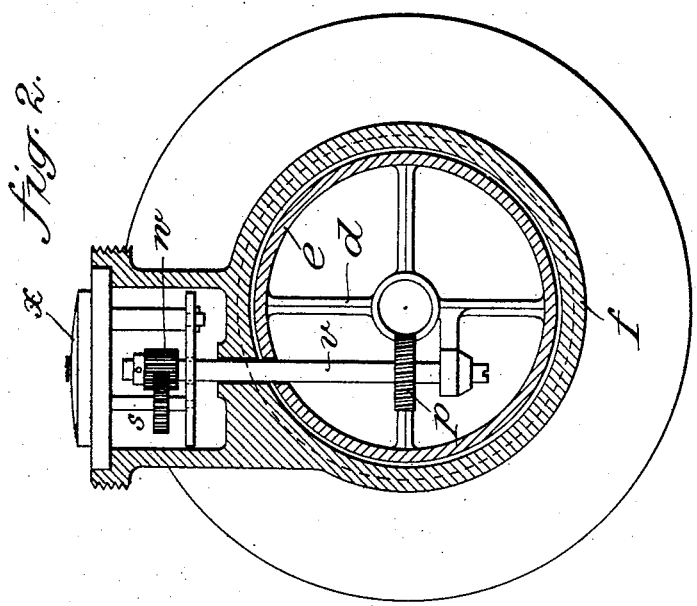
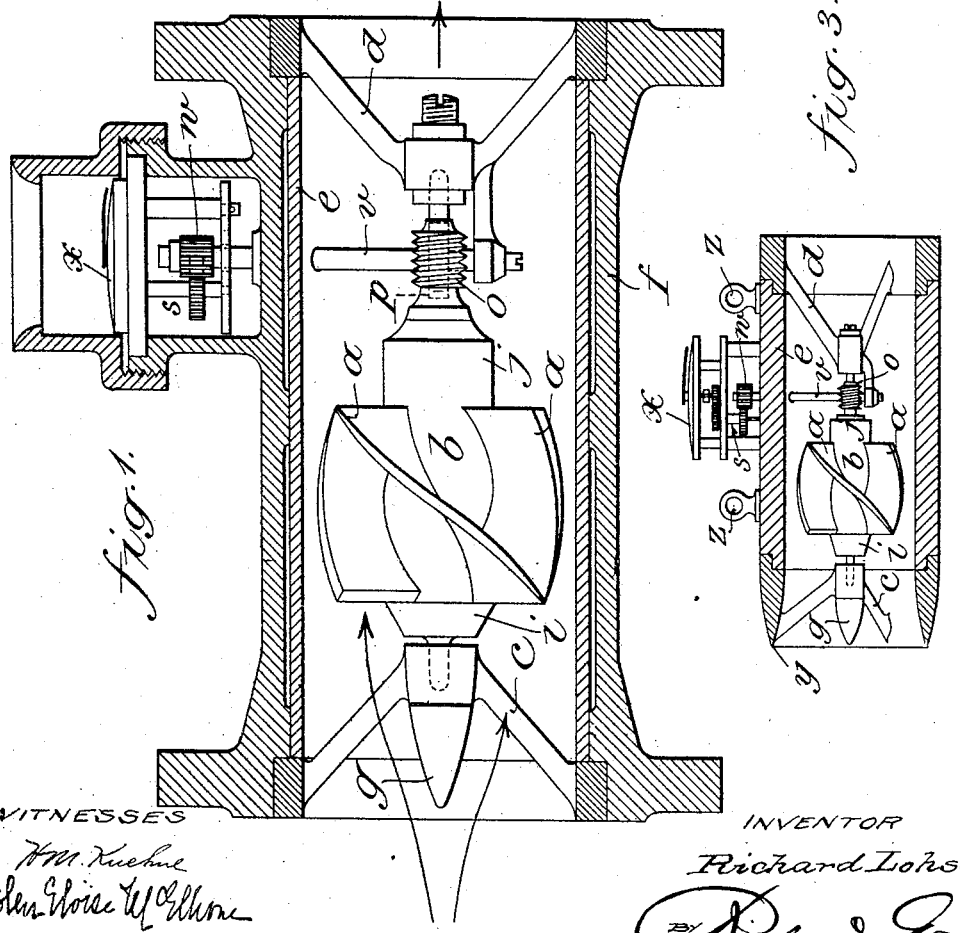
WITNESSES
Wm. Kuehne
Helen Eloise McElhone
INVENTOR
Richard Lohse
By Richardson
ATTORNEYS No. 771,826.

Patented October 11, 1904.

UNITED STATES PATENT OFFICE.

RICHARD LOHSE, OF BRESLAU, GERMANY.

DEVICE FOR MEASURING THE SPEED OF FLOWING LIQUIDS.

SPECIFICATION forming part of Letters Patent No. 771,826, dated October 11, 1904.

Application filed February 27, 1904. Serial No. 195,620. (No model.)

*To all whom it may concern:*

Be it known that I, RICHARD LOHSE, engineer, a subject of the King of Prussia, Emperor of Germany, residing at 33 Brandenburgerstrasse, Breslau, German Empire, have invented new and useful Improvements in Devices for Measuring the Speed of Flowing Liquids, of which the following is a specification.

My invention relates to a device for measuring the velocity of currents of water or other liquids and belongs to that class of meters which can either be inserted in pipes or sunk in a river or current—that is to say, can be either employed to measure the velocity of the water or other liquid flowing along a conduit or the velocity of rivers or currents in general.

My new current-meter comprises the various devices, in part already known, described in detail below, by the combination of which a current-meter meeting all requirements is presented.

In the accompanying drawings, Figure 1 is a longitudinal section, and Fig. 2 a cross-section, of a meter adapted for insertion in a pipe. Fig. 3 is a longitudinal section of a like meter suitable for sinking in the course of a river.

The essential features of my invention are as follows:

First. A so-called "Woltmann" tachometer or current-meter—that is to say, a wheel having spirally-running blades or vanes $a$, which do not contact with the walls of the casing, the said blades being mounted on a shaft $b$, rotating in bearings $c\ d$. The shaft $b$ has a conical portion $i$, while at the opposite end $j$ it extends beyond the blades $a$. This shaft is hollow and, like the blades, is made of a material whose specific gravity is as near as possible to that of the liquid whose velocity is to be measured. In consequence of the buoyancy thus secured the pressure at the bearings and the consequent friction between journals and bearings are almost entirely overcome.

Second. The arrangement of a removable bushing or sleeve $e$, which when the meter is to be inserted in a pipe is pushed into the actual casing $f$ of the water-gage. This bushing $e$ is of special material, capable of resisting oxidation and incrustation, so as to avoid the accurate operation of the apparatus from being injuriously influenced. The external diameters of the hollow shaft $b$ and blades $a$ are respectively such that between the outer edges of the blades and the inner wall of the bushing $e$ a certain space is left and the surfaces of the blades only extend over a circular zone of the cross-section of the pipe, which is to be regarded as—*i. e.*, is identical with—the zone of average velocity of flow.

Third. The special form of the bearing $g$ at the inlet for the liquid in the form of a shell or conical bullet, the purpose of which shape is to conduct the central portion of the inrushing liquid over the conical part $i$ of the wheel to the blades, whereby damming effects, which injuriously affect the precision of the meter, are avoided and constant uniform action of the wheel thus insured.

Fourth. The transmission of the rotary motion of the wheel by means of a worm $o$, secured to the hollow shaft $b$, which worm engages with a worm-wheel $p$, mounted on a spindle $v$, located vertically of the shaft $b$ and crossing it, so that it lies laterally of the center of the meter-casing. The spindle $v$ also carries a pinion $w$, actuating a counting and registering mechanism $s$, located coaxially above the spindle. By adopting a suitable ratio of transmission for the gear-wheels the amount of liquid which has flowed through the apparatus can be read off on a dial $x$.

If the above-described meter is to be lowered directly into running water for the purpose of ascertaining the velocity of flow, the construction shown in Fig. 3 may be employed. Here the casing $f$, Fig. 1, is omitted, and the casing $e$, which surrounds the wheel $b$, is formed with a sharp edge at $y$ for the purpose of preventing the resistance to entry of the water and to hinder the formation of eddies. To enable convenient sinking of the meter into the current, the casing $e$ is provided with eyes $z$, by means of which the meter can be secured to wires or the like.

Having thus described my invention, what I claim as new, and desire to secure by Letters Patent, is—

A device for measuring the speed of flowing liquids, comprising in combination, a hollow shaft, a wheel having inclined blades forming portions of a screw-surface, mounted on the shaft, said shaft and wheel being made of a material of approximately the same specific gravity as that of the liquid to be measured, a tubular casing of oxidation and incrustation resistant material, in which the shaft is coaxially mounted without the wheel-blades contacting with the casing-walls, a substantially conically shaped bearing for the shaft at the liquid-inlet, a worm on the shaft, a spindle located vertically and crosswise of the shaft, a worm-wheel on the spindle engaging said worm, and a counting and registering mechanism located coaxially of the spindle and driven by the same, substantially as described.

In witness whereof I have hereunto signed my name, this 3d day of February, 1904, in the presence of two subscribing witnesses.

RICHARD LOHSE.

Witnesses:
CARL SCHREIBER,
EUGEN WEIMAR.